United States Patent Office 2,955,907
Patented Oct. 11, 1960

2,955,907
PROCESS FOR THE PRODUCTION OF SHAPED ARTICLES FROM RUBBERY POLYMERS CONTAINING REACTIVE GROUPS

Günter Kolb, Koln-Stammheim, Germany, assignor to Farbenfabriken Bayer Aktiengesellschaft, Leverkusen, Germany, a corporation of Germany No Drawing. Filed Oct. 5, 1955, Ser. No. 538,781

8 Claims. (Cl. 18—54)

The present invention relates to a process of producing shaped articles from rubbery polymers containing reactive groups.

It has been found that rubber-like shaped articles of high strength such as for example filaments, films, foils or strips can be obtained if a synthetic rubbery polymer containing reactive groups is introduced in emulsified or dissolved form into a precipitation bath containing polyfunctional compounds containing at least two groups which are capable of reacting with the reactive groups of the synthetic rubbery polymers, in which precipitation bath the polymers are coagulated, whereafter the coagulated product is removed from the bath and dried.

Suitable rubbery polymers consist essentially of linear carbon chains to which are linked from 0.005–0.6 mol by weight of reactive groups such as carbonyl-, carboxyl-, sulfonic acid, carbonamide or basic groups per 100 parts by weight of rubbery polymer.

These polymers may be obtained by copolymerizing monomers which have polymerizable carbon-to-carbon double linkages and have an elasticizing action with organic compounds which have reactive groups and are copolymerizable with said elasticizing monomers.

Suitable monomers which have polymerizable carbon-to-carbon double bonds and have an elasticizing action are for example acrylic acid or methacrylic acid esters of aliphatic alcohols with at least 4- C-atoms preferably with 8–14 C-atoms, vinyl alkyl ethers the alkyl radical of which contains 1–8 C-atoms, and compounds with two conjugate carbon-to-carbon double bonds, such as for example butadiene or homologues and derivatives of butadiene, such as isoprene, 2.3-dimethyl butadiene-1.3, 2-chlorobutadiene-1.3, 2-cyanobutadiene-1.3. The said monomers which have an elasticizing action are preferably applied in quantities amounting to about 15–99 percent by weight as calculated in the total amount of monomers applied.

Suitable copolymerizable compounds with reactive groups are those which contain, for example carbonyl, carboxyl, sulfonic acid, carbonamide or basic groups, preferably basic nitrogen groups, which are capable of salt formation with organic acids. Examples of polymerizable compounds containing carbonyl groups are: acrolein, α-substituted acroleins, such as α-methyl acrolein, and vinyl alkyl ketones, such as for example vinyl methyl ketone, vinyl ethyl ketone, isopropenyl methyl ketone. As polymerizable compounds with carboxyl groups, there may be considered both mono- and polycarboxylic α-β-ethylenically unsaturated acids, such as for example acrylic acid, methacrylic acid, sorbic acid, maleic acid, maleic acid anhydride or fumaric acid. It is also possible to use the mono-esters of the polycarboxylic acids, such as monoesters of maleic acid with aliphatic, cycloaliphatic and araliphatic alcohols having 1–14 carbon atoms as for instance maleic acid monomethylester, maleic acid monobutylester, maleic acid monododecyl ester, maleic acid monocyclohexylester. Examples of polymerizable compounds with carbonamide groups are: Acrylamide, α-methacrylamide, α-isopropylacrylamide, α-chloroacrylamide. Heterocyclic nitrogen bases containing vinyl groups such as 2-vinyl pyridine and 2-vinyl-5-ethyl pyridine are examples of basic unsaturated compounds. Furthermore, vinylsulfonic acid may be used as a suitable copolymerizable compound. Said monomers with reactive groups may be applied in quantities amounting to about 0.5–50 percent by weight as calculated on the total amount of monomers.

In addition to the said monomers, other organic compounds each containing at least one polymerizable carbon-to-carbon double bond may be used for the production of the copolymers, these compounds being for example styrene, acrylonitrile, methacrylonitrile, acrylic acid or methacrylic acid esters of alcohols with 1–3 C-atoms, vinyl chloride, 1.1-dichloroethene.

Furthermore polyfunctional monomers containing at least two active olefinic non-conjugate double bonds which act as cross-linking agents may be used, however, these latter compounds are applied in comparatively small amounts, preferably not surpassing 0.001–1 percent by weight calculated on the total amount of monomers applied. Suitable cross-linking agents are for instance aromatic hydrocarbons containing at least two vinyl groups such as divinylbenzene, esters of polyhydric alcohols or of aromatic compounds containing at least two phenolic hydroxy groups with α-β-ethylenically unsaturated monocarboxylic acids such as ethylenedimethacrylate, ethylenediacrylic, pentaerythityl tetramethacrylate, resorcinoldimethacrylate, half-esters of maleic acid or substituted maleic acids such as α-chloromaleic acid with polyhydric alcohols such as the reaction product of 1 mol of ethyleneglycol or similar dihydric alcohols with 2 mols of maleic anhydride, the reaction product of trihydric alcohols such as trimethylolpropane with two or three mols of maleic anhydride, furthermore divinylether, divinylsulfone.

Reference is also to be made to such copolymerizable compounds as have their reactive groups present in masked form, the said groups being liberated by reaction with a hydrolizing agent after the polymerization: examples of such compounds are saponifiable esters, such as acrylic and methacrylic alkyl esters, vinylsulfonic alkylesters, (butylvinylsulfonate) unsaturated nitrile (acrylonitrile) or the unsaturated amides above referred to.

Of the compounds with reactive groups referred to above, those which have proved particularly satisfactory are the polymerizable monomers containing carboxyl groups, since the copolymers obtained with these monomers produce shaped articles such as threads or filaments of particularly high initial strength after coagulation.

For the production of shaped articles, the copolymers are preferably used in the form of their emulsions. The latter are obtatined by the monomers being emulsified according to known processes, preferably in an aqueous medium, and being polymerized in the presence of suitable catalysts.

As examples of emulsifiers, there are to be mentioned the alkali salts of paraffin sulphonates obtained by sulphochlorination of long-chained paraffins with about 12–18 carbon atoms and subsequent saponification (German Patent 750,330). The activation of the polymerization may be carried out with radical-forming substances, such as for example with azo dinitriles per-compounds or with Redox systems, under which are understood the combinations of compounds yielding oxygen and reducing compounds. Particular reference is to be made to the activation of the emulsions by aliphatic sulphinic acid salts, preferably with a carbon chain of about 12–18 carbon atoms, without addition of compounds yielding oxygen (Makromolekulare Chemie, volume 3, page 43 (1949)). It is also possible to influence the copolymers as regards their thermoplastic behaviour by adding so-called regulators. Prior to working up copolymers of butadienes, it is of course advisable to add so-called stabilisers, such as for example phenyl-β-naphthylamine or suitable phenols. The copolymer emulsions may also be prepared by the monomers being polymerized in block form or in solution and subsequently emulsified. The emulsions contain preferably about 10–60 percent by weight of polymers. The polymers may furthermore be applied in dissolved form. Suitable solvents are aromatic hydrocarbons such as benzene, chlorbenzene, 2.4-dichlorobenzene, ketones, such as methylethylketone or mixture of said solvents. The solution of the polymers in said solvents contain 8–40 preferably 10–20 percent by weight of polymers.

The choice of the polyfunctional compounds which are to be reacted with the reactive groups of the copolymers is dependent on the nature of the reactive groups of the copolymers. Among the numerous combinations which are possible, the following are to be mentioned as examples in respect of copolymers containing carbonyl groups: Polyamines and polyamides containing at least two $NH_2$ groups, such as for example ethylene diamine, butylene diamine, hexamethylene diamine, nonamethylene diamine, diethylene triamine, triethylene tetramine, hexamethylene pentamine, hydrazine, urea, thiourea, oxalic acid diamide, succinic acid diamide, adipic acid diamide, terephthalic acid diamide. In this case the carbonyl group of the copolymers react with the amino groups under formation of =C=N— linkages. For the copolymers containing carboxyl groups, there may be considered polyamines containing at least two

groups, $R_1$ and $R_2$ standing for hydrogen, alkyl having 1–18 carbon atoms, aryl, such as phenyl, aralkyl, such as benzyl, whereby $R_1$ and $R_2$ may stand for same or different substituents. Suitable polyamines are those referred to above by way of example; furthermore, the said polyamines in which at least one hydrogen atom of one of the amino or imino groups is substituted by one of the aforementioned substituents such as N-methylethylene diamine, N-N'-dimethylethylene diamine, N-N-N'-N' - tetramethylethylene diamine. Furthermore, water soluble salts, or hydroxides of polyvalent metals, such as calcium chloride, barium-chloride, magnesiumchloride, zincchloride, zincsulphate, ferroussulphate, barium hydroxide, calcium hydroxide, chromium acetate, chrome alum, copper acetate and aluminium salts such as aluminium sulphate may be used. The aforementioned cross-linking agents react with the carboxyl groups of the copolymers with the formation of salts, whereby said agents effect a cross-linkage of the copolymers by way of the salt groups formed. If it is to be understood that the polyamines may also be applied in form of their salts with weak organic and inorganic acids such as carbonic acid, acetic acid, benzoic acid, stearic acid, boric acid. In case that polyamines with primary or secondary amino groups or their salts are used as cross-linking agents the salt groups formed during reaction in the precipitating bath in the first stage are transformed into carbonamid or carbonimid groups during the drying process which follows the coagulating step. Other suitable cross-linking agents are organic compounds containing at least two epoxy groups such as di-glycidyl trimethylolpropane obtained by reaction of 1 mol of trimethylolpropane with 2 mols of epichlorhydrine, di-glycidyl-glycerin obtained by reaction of 1 mol of glycerin with 2 mols of epichlorhydrine, diglycidyl-diphenylolpropane obtained by reacting 1 mol of di-p-hydroxyphenyl-dimethyl-methane with 2 mols of epichlorhydrine, diglycidylanilide. These polyepoxycompounds are preferably applied in alcoholic solution. For accelerating the reaction of the epoxy groups with the carboxyl groups of the polymers, whereby polyester formation occurs, the polymer after leaving the coagulation bath is aftertreated with alkaline agents such as aqueous solutions of alkali metal hydroxydes, earthalkali metal hydroxydes, ammonia, organic amines, such as dibutylamine, trimethylamine, triethylamine. The copolymers containing carbonamide groups may be reacted with aliphatic and aromatic aldehydes such as acetaldehyde, propionaldehyde, butyraldehyde, glyoxal, benzaldehyde, preferably formaldehyde, its different polymeric modifications or compounds thereof yielding formaldehyde, such as hexamethylene tetramine, rongalite, or compounds containing several reactive methylol compounds, such as hexamethylol melamine, dimethylolurea. Polybasic organic acids, such as oxalic acid, itaconic acid, fumaric acid, maleic acid, succinic acid, glutaconic acid, citric acid, adipic acid, tartaric acid, 1.5-naphthalene disulphonic acid, 1.3-benzenedisulphonic acid, may be considered in respect of the copolymers containing basic groups.

As to the composition of the coagulating baths preferably water or alcohols such as methanol, ethanol or mixtures of water with alcohols may be used as solvents, although the invention is not restricted to the use of such solvents. The amount of cross-linking agents applied may vary within wide limits. Preferably amounts of a cross-linking agent should be utilized sufficient to react with at least 1/10 of the reactive groups. Good results are also obtained if the amount of cross-linking agents is at least chemically equivalent to the reactive groups present in the polymer. For achieving this result the coagulating bath should preferably contain 1–50 percent by weight of cross-linking agent, although higher concentrations are also applicable. Besides the cross-linking agents the coagulating bath may contain coagulating agents as for instance strong electrolytes such as sodium chloride, potassium chloride, sodium sulphate, calcium chloride, zinc chloride, magnesium chloride in amounts of about 1–30 percent by weight. The pH value of the coagulating bath depends on the type of reaction by which cross-linking of the polymers is effected. In case that polymers with carboxylic or sulphonic acid groups are used the pH value is preferably kept at about 6–10 if polyamines and their salts and/or hydroxides of polyvalent metals are applied as cross-linking agents. The salts of the polyvalent metals require a pH value of about 4–7. With mixtures of polyvalent metals and polyamines the pH value may be kept at about 6–10. For the coagulation of the polymers with carbonyl groups the coagulation bath should contain polyamines in the aforementioned concentrations. The pH value of said coagulation baths is kept at about 7–10. When polymers with carbonamide groups are used the coagulation bath contains aldehydes and may have a pH value of about 6–10. The precipitation baths may also contain thickening agents such as polyvinylalcohol, salts of polyacrylic acid, alginic acid, carboxymethylcellulose which are soluble in water or alcohol, casein, gelatine, agar-agar in concentration of about 1–15 percent by weight. The temperature of the coagulation bath depends on the reactivity of the components applied. Generally speaking it may be kept at temperatures of about 20–70° C.

After leaving the coagulation bath the coagulated articles may be washed with water or alcohol in order to remove a surplus of coagulating agents adhering to the coagulates. The temperature of the washing agents is kept at about 20–70° C. Finally the shaped coagulate is dried at temperatures of about 50–150° C., preferably 90–120° C.

The process is particularly suitable for the production of threads from aqueous emulsions of butadiene copolymers which contain carboxyl groups. These emulsions are introduced through a nozzle into the precipitating bath. By the use of polyvalent amines, such as ethylene diamine, in the precipitating bath, which advantageously also contains electrolytes, such as for example calcium chloride or sodium phosphate, a thread which is ready for use is obtained immediately after the emulsion has entered the precipitating bath, it only being necessary for the said thread to be washed, dried and reeled. This thread shows excellent tensile strength values with high elongation only a short time after being dried, such as could not be formerly obtained with butadiene-containing polymers, even from solutions. It is obvious that the copolymer emulsions may have added thereto the conventional vulcanisation auxiliaries, such as sulphur and accelerators. The threads may also be heated to a temperature higher than that of the actual drying process, whereupon additional cross-linking may take place. Such after-treatments may also be carried out under tension or with additional shaping. The butadiene-acrylonitrile copolymers which contain free carboxyl groups present an excellent resistance to solvents and have a high tensile strength and a high resistance to ageing and heat.

The copolymer emulsions or solutions which have been described may of course also have added thereto other natural or synthetic rubber latices or plastic emulsions, fillers, plasticisers, resins, dyestuffs, pigments, solvents or other high polymers capable of being cross-linked in accordance with the same principle. Examples of such high polymers are polyacrylic acids, carboxy methyl cellusose, alginic acid, protein compounds such as casein, furthermore polyesters, etc.

The mole of carrying out the present invention may be varied within very wide limits. Instead of producing threads, webs or films, it is for example also possible to produce hoses by the use of annular nozzles. Moreover, the working up and drying of the shaped coagulates which are obtained may be modified in practically any desired manner, it being of course always necessary to bear in mind the nature of the polymer to be used. Another possibility is for textile filaments of natural or synthetic nature to be impregnated with the above described polymer emulsions or solutions and introduced into a coagulation bath which contains suitable polyfunctional compounds. Furthermore, textile threads may be caused to pass through a nozzle into the above described coagulation bath simultaneously with the emulsion or solution, whereby threads or filaments with a core of textile fibres are obtained. The process can also be carried out in such manner that the latex or solution is applied as a thin layer on to a firm surface, for example a mould, metal plate or a rotating roller or is introduced into a rotating mould and is then if desired continuously coagulated and thereafter cross-linked. Furthermore, impregnations in or on leather, textile materials and paper fleeces may be carried out by using an analogous working method.

As already mentioned, the threads or moulded bodies manufactured according to the present process show a surprisingly high strength shortly after entering the precipitation bath. This ensures a technically satisfactory working up operation. In addition owing to the high strength value of the threads which are obtained, the withdrawal velocity can be adjusted to a very high value. Whereas according to processes hitherto known withdrawal velocities of 1 meter per minute were achieved, the present process allows of using a withdrawal velocity of about 20–60 meter per minute. It is surprising that emulsions of comparatively low concentration containing 10–40 percent by weight of polymer can also be used for carrying this process into effect. It is of course also possible for the viscosity of the emulsions to be increased by suitable additives prior to preparation. The high strength value also permits the production of very thin threads, having diameters of 0.06–0.2 mm., the preparation of which from emulsions formerly presented difficulties.

It is further to be emphasised that the formerly necessary vulcanisation can be dispensed with in connection with the polymers containing butadiene. In connection with the diene-free polymers, an increase in strength is produced by the process which is employed, the said increase being such as could otherwise only be obtained by complicated known after treatment processes, for example with peroxides.

The parts referred to in the following examples are parts by weight.

*Example 1*

2200 parts of butadiene, 1,400 parts of acrylonitrile and 400 parts of the monobutyl ester of maleic acid are emulsified in 5,480 parts of a solution of 160 parts of the sodium salt of a paraffin sulphonic acid with about 12–18 C-atoms in 5,360 parts of water and 120 parts of N/1 sulphuric acid and polymerised while stirring at 25° C. after adding 6.5 parts of diisopropyl xanthogen disulphide and 20 parts of the sodium salt of a paraffin sulphinic acid with 12–18 carbon atoms. 19.5 parts of diisopropyl xanthogen disulphide are additionally supplied in 3 batches, each of 6.5 parts, when 25, 40 and 55% of the monomers are polymerised. After 26 hours, 80% of the monomers are polymerised. The reaction is stopped by adding 40 g. of sodium hydrosulphite, 3% (calculated on the monomers introduced) of the conventional stabilisers, such as phenyl-β-naphthyl amine, are added and the mixture is degasified by a steam distillation of the residual monomers. The emulsion obtained in this manner is caused to flow at a constant hydrostatic pressure in an upward direction through a nozzle into a solution of 350 parts of calcium chloride and 210 parts of ethylene diamine in 3500 parts of water at a temperature of 50° C. The thread which is formed is withdrawn over rollers, washed with water of 50° C. and dried at 120° C. It is thereafter ready for use, shows a tensile strength of 1700 kg./cm.$^2$ with a breaking elongation of 720% diameter of the thread 0.11 mm. and has an excellent resistance to solvents, to heat and ageing.

*Example 2*

1,050 parts of butadiene, 300 parts of styrene and 150 parts of maleic monobutyl ester are emulsified in 1895 parts of a solution of 60 parts of the sodium salt of a paraffin sulphonic acid with about 12–18 carbon atoms in 1850 parts of water and 45 parts of N/1 sulphuric acid and polymerised with addition of 4 parts of diisopropyl xanthogen disulphide, as described in Example 1. With a polymerisation temperature of 35° C. a yield of 60% is obtained after 29 hours. The working up is carried out in accordance with Example 1. If the emulsion is caused to pass through a nozzle into a solution of 350 parts of calcium chloride and 140 parts of triethylene tetramine in 3,500 parts of water at 65° C., there is immediately obtained a non-tacky thread which technically can be worked up satisfactorily and which shows a high tensile strength after drying. (Diameter of the thread 0.14 mm., tensile strength 1080 kg./cm.$^2$, breaking elongation 700%.)

*Example 3*

1,950 parts of acrylic acid butyl ester, 950 parts of 1,1-dichloroethene and 150 parts of methacrylic acid are emulsified in 3,260 parts of a solution of 105 parts of the sodium salt of a paraffin sulphonic acid with about 12–18 carbon atoms in 3,200 parts of water and 60 parts of N/1 sulphuric acid and polymerised while stirring with addition of 22.5 parts of the sodium salt of a paraffin sulphinic acid with about 12–18 carbon atoms at 25° C. A yield of substantially 100% is obtained after 4 hours. As described in Example 1 the emulsion thus obtained is caused to pass through a nozzle into a solution of 350 parts of calcium chloride and 175 parts of hexamethylene diamine in 3,500 parts of water and a thread is obtained which has good strength properties. (Diameter of the thread: 0.3 mm., tensile strength 220 kg./cm.$^2$, breaking elongation 450%.)

Example 4

1,125 parts of acrylic acid butyl ester, 225 parts of acrylo nitrile and 150 parts of maleic acid monobutyl ester are emulsified and polymerised as described in Example 3. A yield of substantially 100% is obtained after three hours with a polymerisation temperature of 30° C. The emulsion is processed to form threads as described in Example 3.

Example 5

1,200 parts of butadiene, 150 parts of methacrylic acid methyl ester and 150 parts of maleic acid monobutyl ester are emulsified as described in Example 1 and polymerised at 40° C. with the addition of 5.4 parts of n-dodecyl mercaptan and 7.5 parts of the sodium salt of a paraffin sulfinic acid with 12–18 carbon atoms. After 15 hours, the polymerisation is interrupted by the addition of 15 g. of sodium hydrosulfite. Threads produced from the emulsion by the process described in Example 1 have a tensile strength of 660 kg./cm.$^2$ and an elongation at break of 770% at a diameter of 0.25 mm.

Example 6

1275 parts of butadiene, 150 parts of acrylonitrile and 75 parts of methacrylic acid are emulsified and polymerised as described in Example 5. After 13 hours the polymerisation is stopped by the addition of 15 g. of sodium hydrosulfite and the residual monomers are removed from the emulsion by steam distillation. By introducing the emulsion into a precipitation bath containing 120 parts of ethylene diamine and 300 parts of calcium chloride dissolved in 3500 cc. of water threads are obtained which, at a diameter of 0.18 mm., show a tensile strength of 491 kg./cm.$^2$ and an elongation at break of 735%.

Example 7

5700 parts of butadiene, 3500 parts of acrylonitrile and 800 parts of maleic acid monocyclohexyl ester are emulsified 10,000 parts of water with the addition of 3500 parts of a 10% solution of the sodium salt of a paraffin sulfonic acid with about 12–18 carbon atoms and 300 parts of n/1 sulfuric acid. Polymerisation is initiated by forcing in an aqueous solution of 50 g. of the sodium salt of a paraffin sulfinic acid with about 12–18 carbon atoms. As regulators, 40 g. of diisopropyl xanthogene disulfide are added under pressure in 3 portions after 15, 30 and 45% of the monomers are polymerised. A yield of 77% polymer is obtained at a temperature of 25° C. after 25.5 hours. The polymerisation is stopped by the addition of 100 g. of sodium hydrosulfite dissolved in 2000 cc. of water and degasified as described in the preceding examples. Threads produced from this emulsion have a tensile strength of 1270 kg./cm.$^2$ and an elongation at a break of 660% at a diameter of 0.14 mm.

Example 8

6500 parts of butadiene, 2500 parts of methacrylic acid methyl ester and 1000 parts of maleic acid monocyclohexyl ester are emulsified and polymerized as described in Example 7. At a temperature of 35° C. a yield of 72% is obtained after 32 hours. The threads produced from this emulsion have a tensile strength of 570 kg./cm.$^2$ and an elongation at break of 720% at a diameter of 0.22 mm.

Example 9

3000 parts of butadiene, 2500 parts of acrylonitrile, 3500 parts of methacrylic acid methyl ester and 1000 parts of maleic acid monobutyl ester are emulsified and polymerised as described in Example 7. At a polymerisation temperature of 45° C. a yield of 75% is obtained after 35 hours. The thread produced from this emulsion is extraordinarily resistant to heat and ageing and, after heating to 14° C. for 30 hours, showing a tensile strength of 446 kg./cm.$^2$ and an elongation at break of 375%.

Example 10

7000 parts of butadiene, 1000 parts of acrylonitrile, 1250 parts of styrene, 500 parts of maleic acid monobutyl ester and 250 parts of methacrylic acid are emulsified and polymerised as described in Example 7. At a polymerisation temperature of 20° C. a yield of 81% is obtained in 17.5 hours.

Examples 11–18

The emulsion prepared as described in Example 10 is coagulated in different coagulating baths. The composition of these baths and the physical data of the threads prepared from this emulsion under the conditions set forth are given in the table below:

| Example No. | 11 | 12 | 13 | 14 | 15 | 16 | 17 | 18 |
|---|---|---|---|---|---|---|---|---|
| water in cc | 3,500 | 3,500 | 3,500 | 3,500 | 3,500 | | | 3,500 |
| ethyl alcohol in cc | | | | | | 3,500 | 3,500 | |
| calcium chloride in g | 350 | | | | | 300 | 240 | |
| barium chloride in g | | 250 | | | | | | |
| barium hydroxide in g | | 110 | | | | | | |
| copper acetate in g | | | 250 | | | | | |
| zinc acetate in g | | | | 250 | | | | |
| calcium acetate in g | | | | | | | | 250 |
| ethylene diamine in g | 115 | | 100 | 110 | | 130 | | 120 |
| triethylene tetraamine in g | | | | | 105 | | | |
| glycerin diepoxide in g | | | | | | | 210 | |
| Tensile strength in kg./cm.$^2$ | 960 | 210 | 432 | 362 | 782 | 695 | 215 | 562 |
| Elongation at break in percent | 680 | 820 | 580 | 630 | 620 | 540 | 470 | 710 |

The glycerin diepoxide was produced according to the process disclosed in U.S. Patent 2,581,464. It has a chlorine content of 8.7%, a molar weight of 330, contains per 149 g. one mol by weight of epoxide.

Example 19

7000 parts of butadiene, 2500 parts of acrylonitrile and 500 parts of vinyl methyl cetone are emulsified in 10,800 parts of water with the addition of 2000 parts of a 10% solution of the sodium salt of a paraffin sulfonic acid with about 12–18 carbon atoms and 200 parts of n/1-sulfuric acid. The polymerisation is initiated by the addition of 40 parts of the sodium salt of a paraffin sulfinic acid with about 12 to 18 carbon atoms. 30 parts of n-dodecyl mercaptan are added in 2 portions during polymerisation to control the polymerisation process. At a polymerisation temperature of 25° C. a yield of 82% is obtained in 32 hours. The polymerisation is interrupted by the addition of 30 g. of hydroquinone and the latex stabilised with 3% by weight of phenyl-β-naphthyl amine referred to the monomers used. The emulsion is then freed of its residual monomers by a steam distillation and passed through a nozzle into a solution of 180 parts of ethylene diamine and 320 parts of calcium chloride in 3500 parts of water at 50° C. The thread thus formed is withdrawn over rollers washed and dried. It shows a tensile strength of 375 kg./cm.$^2$ and an elongation at break of 520%.

*Example 20*

7000 parts of butadiene, 2500 parts of acrylonitrile and 500 parts of α-methyl acrolein are emulsified and polymerised as described in Example 19. The degasified emulsion is caused to pass through a slot-shaped nozzle into a solution of 125 parts of ethylene diamine and 370 parts of calcium chloride in 3500 parts of water, the coagulation sheet thus formed is withdrawn over rollers, washed at 50° C. and dried at 110° C. The resulting rubber sheet has a tensile strength of 215 kg./cm.$^2$ and an elongation at break of 450% at a thickness of 0.2 mm.

*Example 21*

2100 parts by weight of acrylic acid butyl ester and 900 parts by weight of methacrylic acid methyl ester are emulsified in 3700 parts by weight of a solution of 110 parts by weight of the sodium salt of a paraffin sulfonic acid with about 12–18 carbon atoms in 3200 parts by weight of water and 60 parts by weight of n/1-sulfuric acid and polymerised with the addition of 22.5 parts by weight of the sodium salt of a paraffin sulfinic acid with about 12–18 carbon atoms and at 30° C while stirring. After 6 hours a yield of almost 100% is obtained.

5000 parts by weight of this emulsion are slowly mixed while stirring with 1400 parts by weight of a 10% aqueous caustic soda solution and stirred at 50° C. for 5 hours. The emulsion is then mixed while stirring with 100 parts by weight of a polyglycol ether of lauryl alcohol and acidified with dilute sulfuric acid to pH 4. By passing this emulsion through a nozzle into a solution of 150 parts by weight of ethylene diamine and 350 parts by weight of calcium chloride in 3500 parts by weight of water, a thread is obtained which is resistant to ageing.

What I claim is:

1. Process for the production of elastic shaped articles which comprises extruding into an aqueous coagulating bath an aqueous emulsion containing 10–60% by weight of a synthetic rubbery polymer consisting essentially of a linear carbon chain to which are linked from 0.005–0.6 mol by weight of carboxyl groups per 100 parts by weight of polymer, so as to produce a self-supporting coherent shaped coagulate, said coagulating bath containing dissolved therein an agent capable of reacting with said carboxyl groups to effect cross-linkage, said agent being selected from the group consisting of a polyamine and a polyepoxy compound, removing said shaped coagulate from said coagulating bath at a withdrawal velocity of about 20–60 meters per minute, and drying said coagulate.

2. Process of claim 1 wherein the coagulating bath contains electrolytes having a coagulating action in addition to the agents which effect cross-linkage.

3. Process of claim 1 wherein the aqueous emulsion of a synthetic rubbery polymer is introduced through spinnerets into the coagulating bath with the resultant formation of filaments.

4. Process of claim 1 wherein said polyamine is an aliphatic polyamine.

5. Process of claim 1 wherein said polyamine is a polyalkylene polyamine.

6. Process of claim 1 wherein said aqueous emulsion is an emulsion of a copolymer of 50–90% by weight of a conjugated aliphatic diene having 4–6 carbon atoms, 10–45% by weight of acrylonitrile, and 2–20% by weight of a half ester of maleic acid with a monohydric saturated alcohol having 4–12 carbon atoms, said aqueous emulsion being obtained by copolymerizing the aforementioned monomers in aqueous emulsion.

7. Process of claim 1 wherein said aqueous emulsion is an emulsion of a copolymer of 50–90% by weight of a conjugated aliphatic diene having 4–6 carbon atoms, 10–45% by weight of acrylonitrile, and 2–20% by weight of a half ester of methacrylic acid, said aqueous emulsion being obtained by copolymerizing the aforementioned monomers in aqueous emulsion.

8. Process of claim 6 wherein said half ester of maleic acid is maleic acid monobutyl ester.

References Cited in the file of this patent

UNITED STATES PATENTS

| | | |
|---|---|---|
| 2,178,955 | Draemann | Nov. 7, 1939 |
| 2,227,277 | Shepherd | Dec. 31, 1940 |
| 2,288,982 | Waterman | July 7, 1942 |
| 2,395,505 | Sarbach | Feb. 26, 1946 |
| 2,526,639 | Cupery | Oct. 24, 1950 |
| 2,604,668 | Miller et al. | July 29, 1952 |
| 2,647,887 | Goppel | Aug. 4, 1953 |
| 2,681,327 | Brown | June 15, 1954 |